US009875208B2

(12) United States Patent
Boyle et al.

(10) Patent No.: US 9,875,208 B2
(45) Date of Patent: Jan. 23, 2018

(54) METHOD TO USE PCIE DEVICE RESOURCES BY USING UNMODIFIED PCIE DEVICE DRIVERS ON CPUS IN A PCIE FABRIC WITH COMMODITY PCI SWITCHES

(71) Applicant: Futurewei Technologies, Inc., Plano, TX (US)

(72) Inventors: Thomas Boyle, Santa Clara, CA (US); Chang Yu, Hangzhou (CN); Wesley Shao, Cupertino, CA (US); Ligang Chen, Hangzhou (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 181 days.

(21) Appl. No.: 14/873,995

(22) Filed: Oct. 2, 2015

(65) Prior Publication Data

US 2016/0098372 A1   Apr. 7, 2016

Related U.S. Application Data

(60) Provisional application No. 62/059,677, filed on Oct. 3, 2014.

(51) Int. Cl.
*G06F 13/00* (2006.01)
*G06F 13/40* (2006.01)
*G06F 13/42* (2006.01)

(52) U.S. Cl.
CPC ...... *G06F 13/4072* (2013.01); *G06F 13/4282* (2013.01)

(58) Field of Classification Search
CPC ............... G06F 13/4072; G06F 13/4282
See application file for complete search history.

(56) References Cited

U.S. PATENT DOCUMENTS

| 7,334,071 B2 * | 2/2008 | Onufryk ............... G06F 13/404 370/401 |
| 9,336,173 B1 * | 5/2016 | Sodke ................. G06F 13/4022 |
| 2010/0115174 A1 | 5/2010 | Akyol et al. |

(Continued)

OTHER PUBLICATIONS

International Search Report and Written Opinion dated Dec. 28, 2015 in International Patent Application No. PCT/US2015/053803, 12 pages.

*Primary Examiner* — Jing-Yih Shyu
(74) *Attorney, Agent, or Firm* — Vierra Magen Marcus LLP (57) ABSTRACT

A method for accessing a device in a primary peripheral component interconnect express (PCIe) domain from a secondary PCIe domain includes determining which one or more virtual functions of the device in the primary PCIe domain are to be made available to the secondary PCIe domain. A virtual function driver is installed in the primary PCIe domain associated with the one or more virtual functions. Information corresponding to the one or more virtual functions is provided to the secondary PCIe domain. A virtual function driver associated with the one or more virtual functions is installed in the secondary PCIe domain from the information. The virtual function driver in the secondary PCIe domain has same properties as the virtual function driver in the primary PCIe domain. The device in the primary PCIe domain is accessed from the virtual function driver in the secondary PCIe domain.

17 Claims, 4 Drawing Sheets

(56) References Cited

U.S. PATENT DOCUMENTS

| | | | |
|---|---|---|---|
| 2010/0125653 A1* | 5/2010 | Cherian | G06F 13/4004 709/223 |
| 2010/0153592 A1 | 6/2010 | Freimuth et al. | |
| 2011/0060859 A1* | 3/2011 | Shukla | G06F 9/45558 710/314 |
| 2011/0119423 A1* | 5/2011 | Kishore | G06F 13/102 710/302 |
| 2014/0025770 A1 | 1/2014 | Warfield et al. | |
| 2014/0237156 A1* | 8/2014 | Regula | G06F 21/85 710/314 |
| 2014/0281040 A1 | 9/2014 | Liu | |
| 2014/0281069 A1* | 9/2014 | Mandapuram | G06F 13/4022 710/104 |
| 2015/0143016 A1* | 5/2015 | Egi | G06F 13/32 710/313 |
| 2015/0261709 A1* | 9/2015 | Billi | G06F 13/404 710/316 |

* cited by examiner

FIG. 1

(PRIOR ART)

METHOD TO USE PCIE DEVICE RESOURCES BY USING UNMODIFIED PCIE DEVICE DRIVERS ON CPUS IN A PCIE FABRIC WITH COMMODITY PCI SWITCHES

RELATED APPLICATION

This application claims the benefit of U.S. Provisional Application No. 62/059,677 filed Oct. 3, 2014, which is incorporated by reference herein.

TECHNICAL FIELD

The present disclosure relates generally to peripheral component interconnect express (PCIe) switches with central processing units (CPUs) connected behind Non Transparent Bridges (NTBs) of PCIe switches and more particularly to a method and apparatus for accessing a device in a primary PCIe domain from a secondary PCIe domain.

BACKGROUND

Classical Single CPU and End Point Devices

Figure 1:
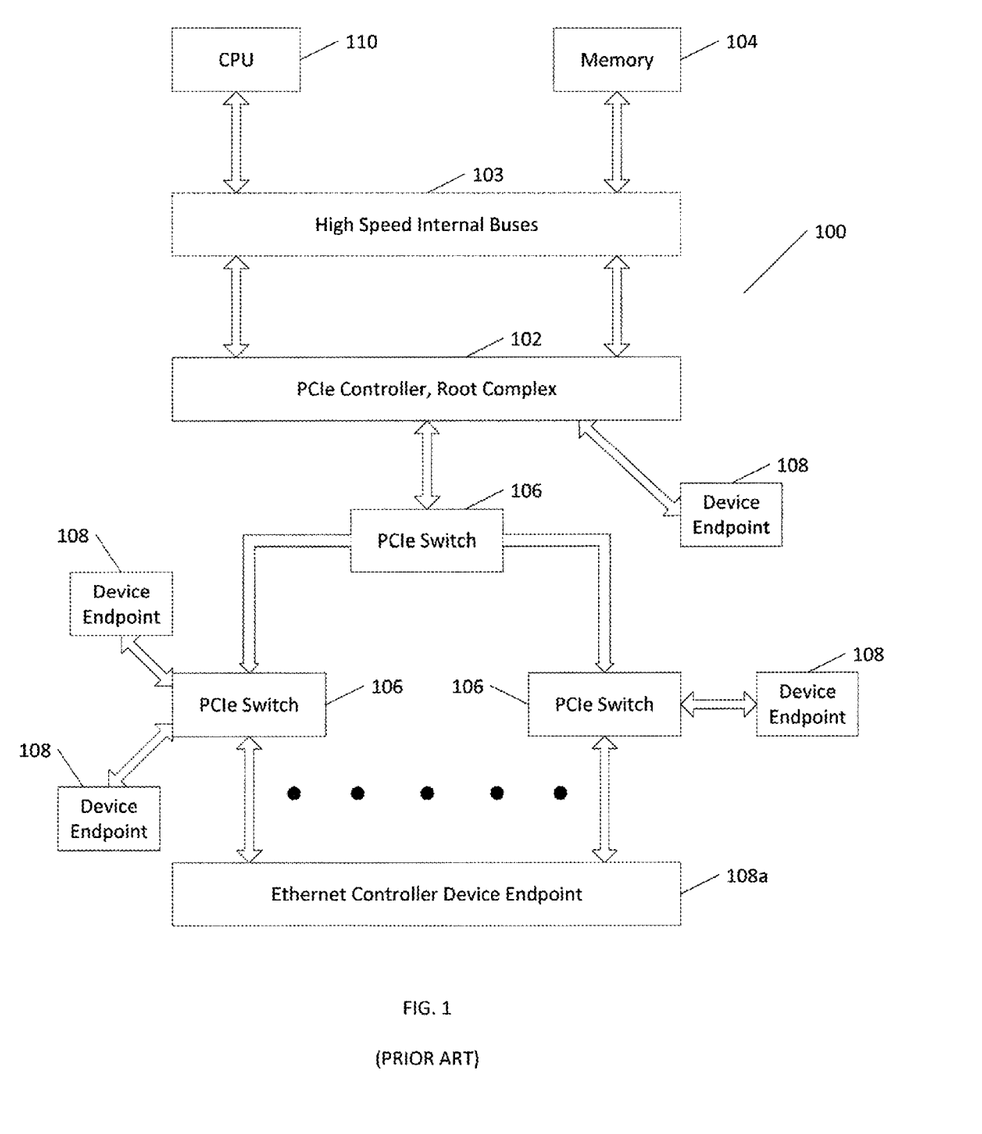
FIG. 1 illustrates a classical single CPU system in a PCIe switch domain.

FIG. 1 illustrates a classical single CPU network 100 in a PCIe switch domain. The uppermost PCIe device is a PCIe controller 102 of CPU network 100 with direct memory access to CPU memory 104. The uppermost device (PCIe controller) in this classical layout is called the "root complex" (root of the tree). Also illustrated down from the "root" are PCIe switches 106 and at end points are PCIe device endpoints 108. CPU network 100 uses a shared parallel bus architecture 103 for communication purposes, in which all devices share a common set of address, data, and control lines.

A CPU host 110 typically executes an operating system that determines the configuration of CPU network 100 by "enumeration". Enumeration finds switches 106 and device endpoints 108 and claims total ownership over all the resources in CPU network 100. Type 1 and type 2 configuration read and write commands are used to discover switches 106, device endpoints 108, and memory resources owned by device endpoints 108 and switches 106. Memory addresses in a PCIe address space are assigned to all resources of both switches 106 and device endpoints 108. Base and limit switch registers are configured for all switches 106 to allow any point in CPU network 100 to understand how to route memory transactions around from device endpoint to device endpoint. CPU host 110 and device endpoints 108 can read and write memory resources anywhere in CPU network 100. Therefore, CPU host 110 can configure device endpoints 108 for use, and device endpoints 108 can act independently once setup to perform functions and read/write to and from CPU memory 104.

For example, one type of device endpoint 108 is an Ethernet controller 108a that can be setup to access transmit and receive descriptors from CPU memory 104, which point to buffers that CPU host 110 manages. Ethernet controller 108a can be associated with one or more PCIe devices (e.g., Ethernet devices). Each Ethernet device can independently transmit buffer contents described by transmit descriptors in its transmit descriptor ring (TX ring) and Ethernet controller 108a can receive data and send this data directly to receive buffers by its DMA function via a receive descriptor ring (RX ring) in CPU memory 104. According to Ethernet device programming and the PCIe standard, Ethernet controller 108a can send interrupts to CPU host 110 via a PCIe memory transaction known as an MSI/MSI-x message. This is a memory transaction that hits CPU host 110 device/interrupt registers in the CPU memory space mapped to PCIe.

Switches for this purpose are in wide use and the cost is relatively low. CPU network 100 is called a transparent PCIe network implementing a single PCIe domain. However, access to this PCIe domain from another network domain requires the use of specialized device drivers or specialized hardware.

SUMMARY

From the foregoing, it may be appreciated by those skilled in the art that a need has arisen for a technique to provide access to a device in one PCIe domain from another PCIe domain without the need for specialized device drivers or hardware. In accordance with the present disclosure, a method and apparatus for accessing a device in a primary peripheral component interconnect express (PCIe) domain from a secondary PCIe domain using unmodified PCIe device drivers on CPUs in a PCIe fabric with commodity PCIe switches are provided that greatly reduce or substantially eliminate problems and disadvantages associated with conventional PCIe fabric implementations.

A method for accessing a device in a primary PCIe domain from a secondary PCIe domain includes determining which one or more virtual functions of the device in the primary PCIe domain are to be made available to the secondary PCIe domain. A virtual function driver is installed in the primary PCIe domain associated with the one or more virtual functions. Information corresponding to the one or more virtual functions is provided to the secondary PCIe domain. A virtual function driver associated with the one or more virtual functions is installed in the secondary PCIe domain from the information. The virtual function driver in the secondary PCIe domain has same properties as the virtual function driver in the primary PCIe domain. The device in the primary PCIe domain is accessed from the virtual function driver in the secondary PCIe domain.

The present disclosure describes many technical advantages over conventional PCIe fabric implementations. For example, one technical advantage is to allow a secondary PCIe domain to access a device in a primary PCIe domain without using specialized device drivers and hardware. Another technical advantage is to provide information from the primary PCIe domain to allow the secondary PCIe domain to install a device driver that has same properties as a corresponding device driver in the primary PCIe domain. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

The present disclosure describes a system that allows PCIe device drivers that are normally written to run on the root complex of a PCIe fabric to run as if it were on a CPU root complex that can access a device even though it is not on such root complex and is in fact behind an NTB which is only capable of making memory translations to the PCIe fabric where the device really exists. The system allows access to virtual functions, physical functions, or device queues which are normally used for independent virtual machines or symmetric multiprocessing (SMP) cores of a CPU by software made available to the operating system. The system avoids complicated changes to device drivers and avoids the need of new types of PCIe switch hardware for this purpose.

PCIe Network of CPUs Connected by Non-Transparent Bridges

Figure 2:
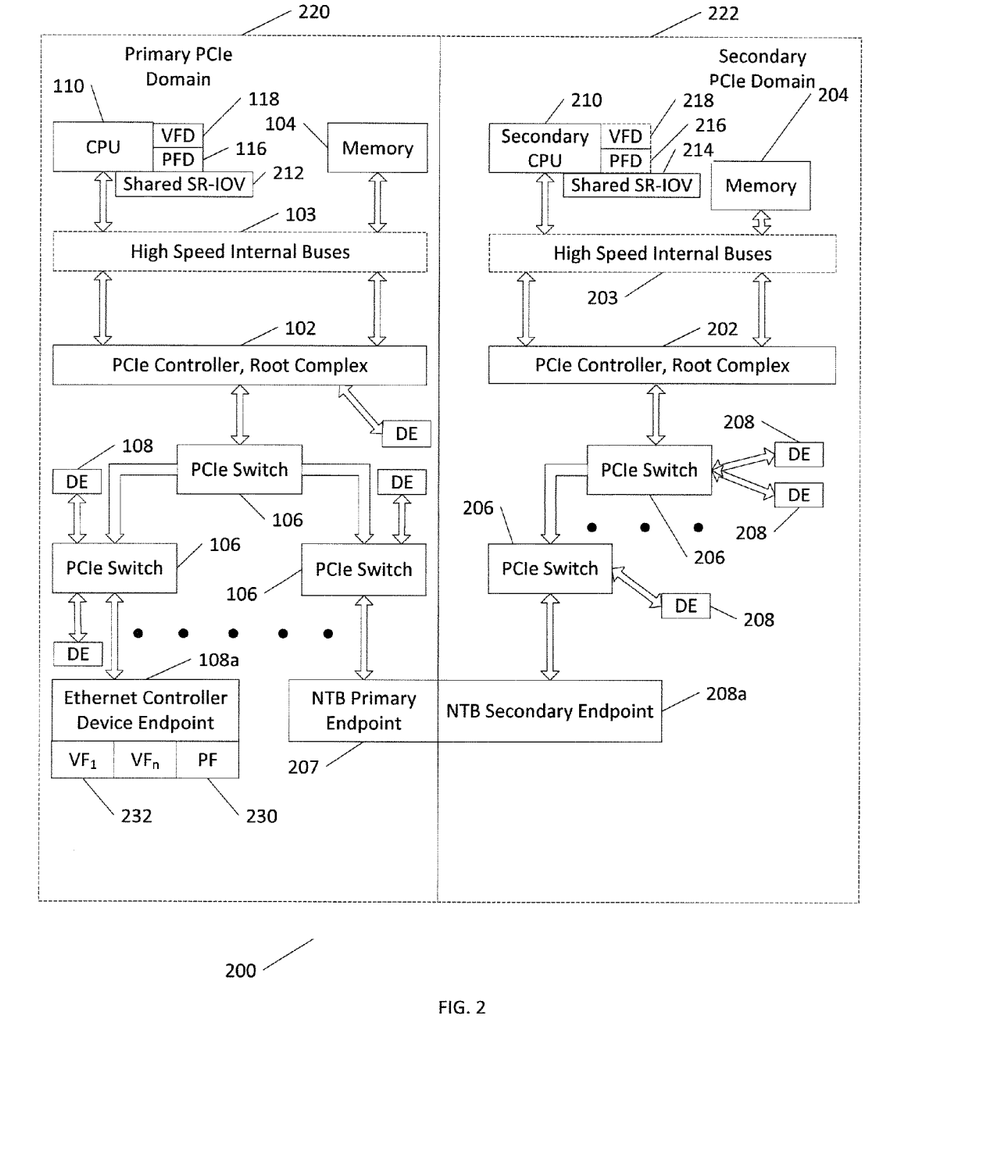
FIG. 2 illustrates a primary PCIe domain as shown in FIG. 1 interconnected with a secondary PCIe domain by Non Transparent Bridge (NTB) primary and secondary endpoints.

FIG. 2 illustrates a CPU network 200 with a primary PCIe domain 220 as illustrated in FIG. 1 and a secondary PCIe domain 222 coupled together with a new type of endpoint referred to as a Non Transparent Bridge (NTB) primary endpoint 207. NTB primary endpoint 207 in primary PCIe domain 220 sits next to a NTB secondary endpoint 208a which is a device endpoint 208 of secondary PCIe domain 222. Secondary PCIe domain 222 includes a similar structure as primary PCIe domain 220 with a CPU host 210, a CPU memory 204, a PCIe controller 202 establishing the root complex, PCIe switches 206, and PCIe device endpoints 208 such as NTB secondary endpoint 208a all interconnected by a high speed internal bus 203.

PCIe networks were originally conceived to have only one root complex and this is true in the present disclosure as well because the primary and secondary root complexes are part of separate domains (e.g., primary PCIe domain 220 and secondary PCIe domain 222, as illustrated). "Non-Transparent Bridging" allows multiple root complexes to operate in a common PCIe network via their respective independent domains NTB primary endpoint 207 and NTB secondary endpoint 208a are PCIe devices that allow the programming of properties which permit memory transactions to cross from one side of the NTB to the other side. In the context of the present disclosure, this type of feature allows a secondary root complex in secondary PCIe domain 222 behind NTB primary endpoint 207 to access device registers or memory of PCIe devices in primary PCIe domain 220. These types of bridges have been developed by different vendors for some time and are in wide use and inexpensive.

Single Root I/O Virtualization (SR-IOV) in Single PCIe Domains

Ethernet controllers 108a were described above regarding classical single CPU network 100 and endpoint devices. Ethernet controller 108a, for example, can be configured to read from CPU memory 104 to read transmit descriptors and buffers in a TX ring and read data from the Ethernet cable and write them to receive buffers in the CPU's RX ring.

Ethernet SR-IOV controllers allow CPU host 110 to set up more RX and TX descriptors, buffers, and rings for purposes such as providing one or multiple virtual machines to run on CPU host 110, establishing multiple CPU operations in a Symmetric Multi-Processing (SMP) system to allow CPU cores to transmit and receive data and gain performance advantages such as, but not limited to, reducing cache coherency conflict and implementing multiple queues for allocating a queue per SMP core.

The SR-IOV abstraction enables virtual machines, or per CPU execution contexts (such as but not limited to "device drivers"), to have their own independent RX/TX rings, descriptors, and buffers to gain performance advantages or other advantages as the case may be.

Single Root I/O Virtualization (SR-IOV) Used by Multiple Root CPU Systems

With the advent of single root I/O virtualization (SR-IOV) PCIe devices, an application has appeared which allows multiple root complexes as described to access the virtual functions of single root I/O virtualization devices from separate domains.

To illustrate, in the single CPU example, a given SR-IOV device (such as Ethernet controller 108a) may have a Physical Function (PF) 230 and 64 Virtual Functions (VFs) 232 and these could be accessed by one CPU. CPU host 110 may have 2 SMP cores and 2 VFs or 1 VF with 2 queues, one for each core, to gain performance advantages. Similarly 10 virtual machines on a CPU may be assigned 10 VFs so that each virtual machine may seem to have its own VF Ethernet controller. PF 230 is used to configure and manage the functionality of a device endpoint 108, such as enabling virtualization and exposing PCIe VFs 232. VF 232 is associated with PF 230 on device endpoint 108 and represents a virtualized instance of device endpoint 108. Each VF 232 has its own PCI Configuration space and shares one or more physical resources on device endpoint 108, such as an external network port, with PF 230 and other VFs 232. The nature of VF 232 is completely as if a driver of VF 232 has total control over Ethernet controller 108a. This is because the driver operates with the same RX and TX Rings that would be present in a non-SR-IOV device. Ethernet controller 108a acts as an Ethernet switch so that each VF 232 is not aware nor does it need to be aware of the other VFs 232.

Primary PCIe domain 220 includes a PF driver 116 that manages PF 230 in the management operating system. The configuration and provisioning of VFs 232, together with other hardware and software resources for the support of VFs 232, is performed through PF driver 116. PF driver 116 uses traditional driver functionality to provide access to the networking I/O resources to the management operating system. PF driver 116 is also used as a way to manage the resources allocated on a device endpoint 108 for VFs 232. Primary PCIe domain 220 also includes a VF driver 118 that is installed to manage VF 232. Any operation that is performed by VF driver 118 does not affect any other VF 232 or PF 230 on the same device endpoint 108. VF driver 118 functions like any PCIe device driver such as reading and writing to VF 232 configuration space. Access to VF 232 is managed by PF driver 230.

The configuration registers of VFs 232 are independent so that independent virtual machine drivers or drivers in different CPU core contexts can access them like independent devices. As a result, a CPU in a second domain on the other side of a non-transparent bridge can configure its own VF driver and make use of a device endpoint 108 in a primary domain as well. However, specialized virtual function drivers are needed in the second domain to provide appropriate access.

Writing specialized virtual function drivers on the side of secondary PCIe domain 222 is known. For example, a CPU host 110 in primary PCIe domain 220 can use configuration cycles to find Ethernet controller 108a and define its position in a configured hierarchy of devices, assign its bus, device, and function numbers, and then assign its programming base address registers (BARs) with PCIe memory locations in primary PCIe domain 220. Once defined, the driver maps access to BARs and programs RX/TX ring information and MSI/MSI-x interrupt registers and so forth for the virtual functions it will use in its domain.

To allow a CPU in secondary PCIe domain 222 to access a virtual function, there is typically a communication protocol between the primary domain root complex and the secondary domain root complex to allow secondary PCIe domain 222 to find out memory address information of a VF 232 on primary PCIe domain 220 and setup memory translations through NTB secondary endpoint 208a and NTB primary endpoint 207 to access them. Then, in effect, the secondary driver can perform essentially the same programming functions to the VF 232 BARs via memory addresses that will translate over to them. Where configuration read or write cycles are needed, these are passed to the primary side root complex via the communication mechanism and performed on behalf of the secondary side root complex by specialized driver software. Where it is needed to program other functions, such as the MSI-x interrupt, the secondary side root complex sends the information about the MSI-x "address" and "datum" for translation registers in NTB primary endpoint 207 to hit CPU host 210 in secondary PCIe domain 222. Other such requirements, such as ensuring that DMA from VF 232 in primary PCIe domain 220 assigned to secondary PCIe domain 222 will hit CPU memory 204, is accomplished with the same or similar mechanisms.

The writing of specialized virtual function drivers on the side of a secondary PCIe domain 222 described above is performed without the need of a Multiple Root I/O Virtualization (MR-IOV) specification. The writing of specialized virtual function drivers on the side of secondary PCIe domain 222 described above accomplishes MR-IOV via SR-IOV and these specialized software mechanisms are referred to herein as "shared SR-IOV" methods. However, these specialized software mechanisms are expensive in terms of maintenance. One alternative to avoid specialized drivers is to handle this capability in specialized hardware. Specialized PCIe switch hardware has been implemented to allow CPUs in secondary domains to execute primary root functions such as configuration cycles and bypass the need for specially written drivers. In this alternative approach, the maintenance overhead is moved to the hardware side. However, this alternative approach does not address the problem when using standard PCIe hardware implementations.

Running Virtual Device Drivers Unchanged

The present disclosure describes a system for running virtual device drivers unchanged as well as other types of drivers unchanged on a secondary PCIe domain 222 without the need for specialized virtual function drivers or specialized hardware. Some advantages of the implementation described in the present disclosure include avoiding specialized shared SR-IOV software changes to virtual device drivers that have been necessary to effect using VFs on secondary CPU networks in secondary PCIe domains 222 which is expensive in terms of maintenance. Supporting specialized changes that might need to be released to the primary PCIe domain 220 can be avoided as they may be considered modifications of the driver. By running virtual device drivers as well as other types of drivers unchanged on secondary PCIe domain 222, there is no need for specialized hardware as existing inexpensive non transparent bridging hardware already widely available can be used without modification. Devices with multiple physical functions can provide the same or similar benefit and devices with multiple queues can also be used across domains to result in the same or similar benefit.

The present disclosure describes a system that includes an application (referred to herein as shared SR-IOV manager) executing in CPU host 110 and 210 that has well defined interfaces to the operating system and provides the mechanisms needed to enable a secondary CPU host 210 and an unchanged virtual function driver to find BARs and configuration space to initialize what is needed to make VFs that it will "think" are present and obtain the same levels of high performance to a VF in primary PCIe domain 220 while all the time "believing" that this function and device exists in its own domain.

As an illustrative example, on CPU host 110 in primary PCIe domain 220 and on CPU host 210 in secondary PCIe domain 222, a shared SR-IOV manager 212 in primary PCIe domain 220 and a shared SR-IOV manager 214 in secondary PCIe domain 222 include a body of code that enables primary PCIe domain 220 and secondary PCIe domain 222 to communicate and exchange information and provide well defined interfaces to the operating system to retrieve or modify standard data or functions located in a different domain. Shared SR-IOV manager 212 may first execute on CPU host 110 in primary PCIe domain 220 and initialize before CPU host 210 in secondary PCIe domain 222 has enumerated its PCIe bus. The communication may be over a PCIe bus through NTB primary endpoint 207 and NTB secondary endpoint 208a or by any other mechanism that may be devised among the domains.

In the case of communicating over the PCIe bus, CPU host 110 of primary PCIe domain 220 enumerates and determines the memory resources of VFs 232, such as in Ethernet controller 108a, including NTB primary endpoint 207 with translation and/or communication functions as the case may be. CPU host 210 of secondary PCIe domain 222 also enumerates its PCIe structures and locates its NTB secondary endpoint 208a.

CPU host 110 of primary PCIe domain 220, through PF driver 116, loads PF 230 of Ethernet controller 108a with parameters that may be required which make the desired number of VFs 232 to appear (max_vfs=nnn) The bus, device, functions, and memory addresses for VFs 232 to be made available for one or more purposes and domains are loaded in shared SR-IOV manager 212 of primary PCIe domain 220. Through the communication mechanism, shared SR-IOV manager 214 of secondary PCIe domain 222 is directed to obtain the information about VFs 232 in primary PCIe domain 220 address space including each VFs BARs, and any other information it may need for the functions described such as the PCIe memory addresses of the MSI-x table offset and the BAR it is located in according to PCIe standards. Primary PCIe domain 220 may determine how many VFs it will make available to secondary PCIe domain 222.

Secondary shared SR-IOV manager 214 collects the information from primary shared SR-IOV manager 212 necessary to create address translations from the primary address space to reach the authorized BAR memory in primary PCIe domain 220. This can be the BAR for VF 232 and the BAR for the MSI-x table if desired. In addition, a simulated copy of the configuration space of all VFs 232 to be made available to secondary PCIe domain 222 is provided by shared SR-IOV manager 212 of primary PCIe domain 220.

Figure 3:
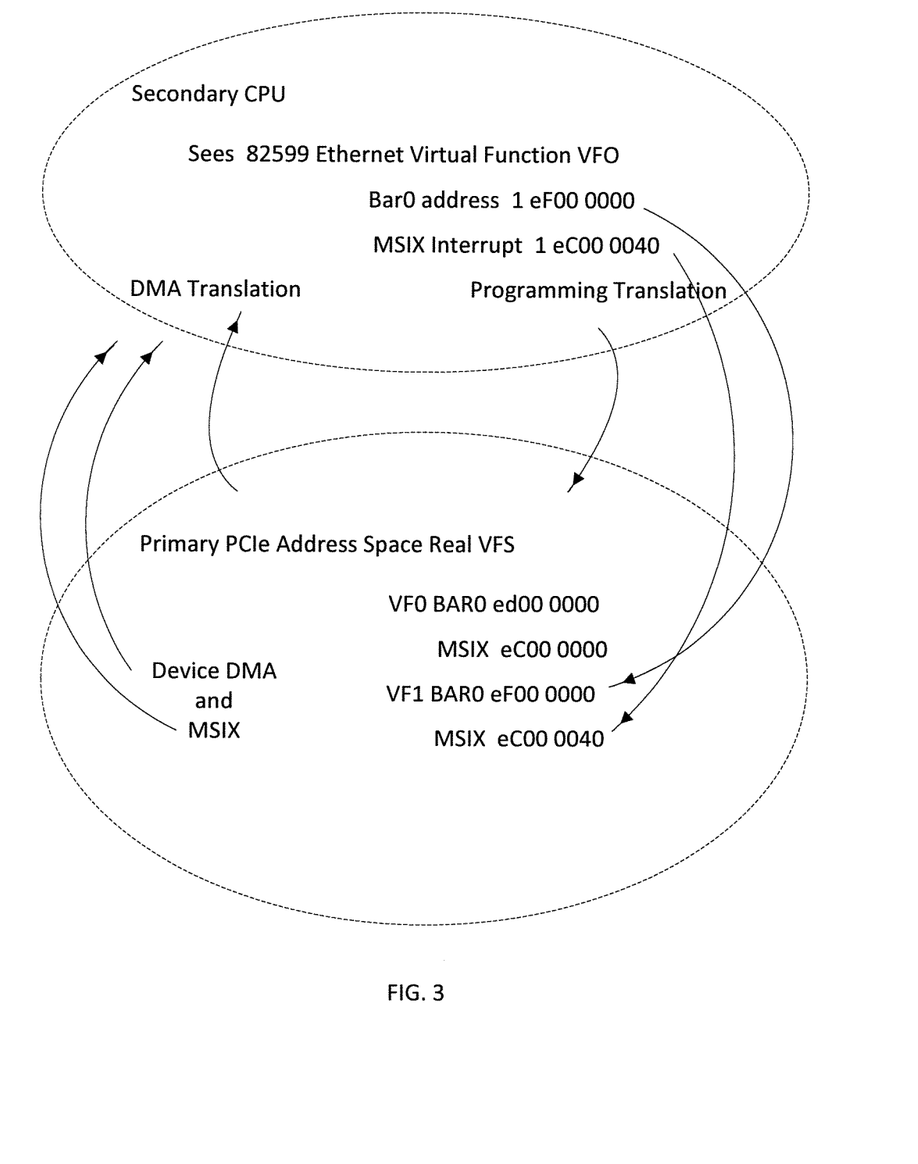
FIG. 3 illustrates a translation scheme between the primary PCIe domain and the secondary PCIe domain.

FIG. 3 shows an example of address translations between secondary PCIe domain 222 and primary PCIe domain 220. Secondary simulated configuration space within secondary PCIe domain 222 for the BARs of VF 232 can be changed to contain PCIe addresses that translate through NTB secondary endpoint 208*a* to the corresponding BARs of VF 232 in primary PCIe domain 220. In addition, the PCIe hierarchy, capabilities, regions, etc. known to the operating system or specific CPU functions is configured for these VFs. Whether configuration space is used as is or has a modified use will be described in further detail below.

Once secondary shared SR-IOV manager 214 receives information corresponding to VF 232 in primary PCIe domain 220, the virtual function driver, VF driver 218, may now be started in secondary PCIe domain 222 and it can use certain operating system functions normally used by PCIe drivers to initialize VFs 232 in primary PCIe domain 220. Secondary PCIe domain 222 also installs a PF driver 216 that operates in a similar manner as PF driver 116 in primary PCIe domain 220. The following is an example list of functions that can be used and their modified use on VFs 232 in secondary PCIe domain 222 is described in further detail below. It will be appreciated by those skilled in the art that other functions may also be used. These functions include pci_request_regions and its sibling functions that request regions or BAR addresses, dma_map_page and dma_map_single and their unmap functions, request_irq in its use for MSI/MSI-x functions, and the functions of pci_enable_device, pci_set_master, and pci_enable_msix (and AER, and memory and many other operating system and configuration space level functions).

As VF driver 218 in secondary PCIe domain 222 starts or probes for its PCIe device type, VF driver 218 may perform the following initialization which occurs through standard operating system functions whose operations are in some cases modified by the well-defined interfaces used by secondary shared SR-IOV manager 214. The function pci_request_regions is for the BARs to be used by the particular VF 232. This function can succeed or fail depending on whether secondary shared SR-IOV manager 214 desires to allow this VF to be used in secondary PCIe domain 222. Secondary shared SR-IOV manager 214 uses its well defined interface to the pci_request_regions code to allow secondary shared SR-IOV manager 214 to regulate this use. Assuming the use of VF 232 is permitted, the initialization can continue. The BAR addresses of VF 232 can be recorded by VF driver 218 and the memory based read and write to BAR registers can translate to the BAR in primary PCIe domain 220.

Functions such as pci_enable_device and pci_set_master and other functions can reach code that can perform configuration read and write data cycles to the PCIe registers and capabilities for device endpoint 108. The operation of the present disclosure is to delegate this operation over to primary PCIe domain 220 via the well-defined interface of secondary shared SR-IOV manager 214. The following is an example list of the possible ways this may be done. The config_read and config_write commands can be passed to primary PCIe domain 220 and executed and the result returned and simulated in secondary PCIe domain 222. The actual pci functions themselves can interact with primary PCIe domain 220 via secondary shared SR-IOV manager 214, however, the use of passing to primary PCIe domain 220 may provide a more transparent method. In some cases, the operation passed to primary PCIe domain 220 may be modified for different desired purposes. For example, access control may be regulated by secondary shared SR-IOV manager 214 through these functions if desired when the pci_enable_device or pci_set_master function is called and may deny the request. Modification of the operation may be required to enact the proper simulation of the operation as needed.

VF driver 218 can enable MSI or MSI-x as necessary with pci_enable_msi or pci_enable_msix or other appropriate functions. VF driver 218 can also call request_irq to set the local CPU interrupt handler for either a particular MSI-x vector or for an MSI interrupt. These functions already define the PCIe "bus" side (or DMA side) address that Ethernet controller 108*a* should hit with the specially created datum that can hit the APIC or other CPU architecture register for the desired interrupt. Secondary shared SR-IOV manager 214 can, through its well defined interface, modify this function similarly. The computed address for the MSI/MSI-x message should be computed properly to translate through the bridge from primary PCIe domain 220 to secondary PCIe domain 222 CPU interrupt registers with the computed datum (which generally does not need modification). Other methods such as those described above in relation to delegation to primary PCIe domain 220 may be used.

VF driver 218 can now set up the RX and TX descriptor rings and the descriptors which point to buffers. The addresses VF driver 218 programs into VF 232 BARs are "bus" side (or DMA side) addresses computed by dma_map_page and dma_map_single. The intent of these functions is to provide Ethernet controller 108*a* with the "bus" side addresses that Ethernet controller 108*a* should read or write because (for reasons not described here) the "PCIe bus" side addresses are not always a 1-1 mapping to physical addresses. Secondary shared SR-IOV manager 214 interface to these functions can provide the adjustment to the memory address so that Ethernet controller 108*a* can read and write through the NTB primary endpoint 207 of primary PCIe domain 220 to the RX/TX queues and buffers in secondary PCIe domain 222.

VF driver 218 runs and locates what it believes to be a VF 232 in its domain and can configure and run Ethernet controller 108*a* from that memory resource in its domain in a similar manner as described above. The operation of interrupt handlers and teardown and freeing of Ethernet controller 108*a* operate following the same developed principles as described above. The operating system functions or the config_read and write commands at their lowest level can be made to direct operation to primary PCIe domain 220 invisibly where desired by secondary shared SR-IOV manager 214. The memory access to BARs and the programming of the "PCIe bus" side or DMA addresses are transparently handled and the operational benefit of speed through the PCIe fabric has been gained. The secondary side access to BARs are mapped and secondary PCIe domain 222 maps to primary PCIe domain 220 a PCIe "window" to the CPU host 210 memory 204 and its system registers.

Figure 4:
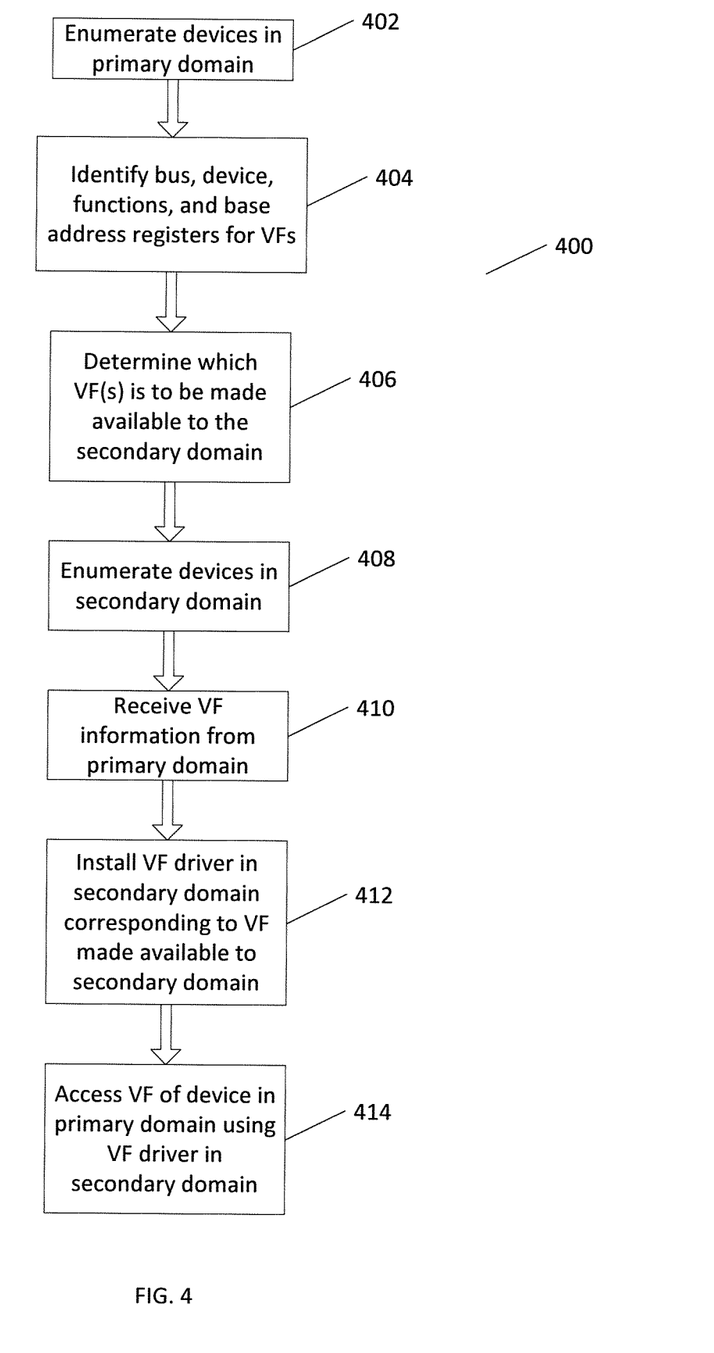
FIG. 4 illustrates a process for accessing a device in the primary domain from the secondary domain.

FIG. 4 shows an example process 400 for accessing a device in primary PCIe domain 220 from the secondary PCIe domain 222. Process 400 begins at block 402 where CPU host 110 in primary PCIe domain 220 performs an enumeration process to discover what devices, such as switches 106 and device endpoints 108 and associated memory resources, are present and assign memory addresses for the discovered devices. In block 404, shared SR-IOV manager 212 as executed by CPU host 110 identifies the bus, device, functions, and base address registers for VFs 232 in primary PCIe domain 220. Shared SR-IOV manager 212 determines in block 406 which VFs 232 are to be made available to secondary PCIe domain 222 (and any other secondary domains). In block 408, CPU host 210 in secondary PCIe domain 222 performs an enumeration process to discover what devices, such as switches 206 and device endpoints 208 and associated memory resources, are present and assign memory addresses for the discovered devices. Shared SR-IOV manager 214 of secondary PCIe domain 222 as executed by CPU host 210 communicates with shared SR-IOV manager 212 in primary PCIe domain 220 in block 410 to receive the appropriate information corresponding to VF 232 being made available to secondary PCIe domain 222. From the information received by shared SR-IGV manager 214, VF driver 218 corresponding to the authorized VF 232 in primary PCIe domain 220 is instantiated in block 412. Using VF driver 218, secondary PCIe domain 222 can access VF 232 of Ethernet controller 108 a in block 414. VF driver 218 operates in secondary PCIe domain 222 just like VF driver 118 in primary PCIe domain 220 in accessing VF 232 of Ethernet controller 108 a. As a result, no specialized driver program needs to be written and no specialized hardware is required to permit a secondary domain to access a device in a primary domain.

The above implementations are illustrative of one example of the system of the present disclosure. Through shared SR-IOV managers 212 and 214, any physical function, virtual function, or base address register or part of a base address register may be conveyed to be found and usable in any secondary PCIe domain in such a way that the original virtual function driver used in the primary domain can be installed therefrom and used in the secondary domain. It will be appreciated that other implementations that operate by the same or similar principle (e.g., transparently allow operating system or low level functions or high level functions to allow a virtual function driver to run unchanged) are contemplated. An example of such implementation includes having secondary shared SR-IOV manager 214, during secondary PCIe domain 222 enumeration, preconfigure configuration space of one or more VFs in primary PCIe domain 220 that can be found during enumeration and this mock configuration can then be used to allow a secondary virtual function driver to configure it and make use of it. The preconfigured configuration can be created statically or dynamically as desired to set the proper BAR addresses that translate from the primary address space to the secondary address space. The handling of dma_map_single, dma_map_page, and dma_map of the MSI/MSIx can be performed either statically or dynamically as the implementer desires. The access to the MSI-x table can be made by memory access and/or configuration space. Secondary CPU host 210 can make the simulated device and/or simulated configuration space appear after it enumerates NTB secondary endpoint 208 a during the enumeration process. The enumeration can be paused to operate a communication mechanism if desired and can add the simulated device and/or simulated configuration space. The simulated device and/or simulated configuration space can be added to secondary PCIe domain 222 via well known "hot plug" mechanisms in use for PCIe devices through a simulated manner.

As the implementer so desires, secondary PCIe domain 222 could be made aware of all VFs or of just some particular VFs for operational simplicity. Secondary PCIe domain 222 can be allowed to access VFs that contain provision for more than one queue to allow CPU cores of SMP systems to have their own access to RX/TX rings and buffers as is done on primary PCIe domain 220 for the same purpose.

The same system of modifying the higher and lower level PCI functions of the operating system to run PCIe device drivers unchanged can also be easily made to operate for the various types of drivers. For example, multiple physical function drivers allow one or more devices to be independently accessed by multiple physical functions. In particular, a physical function driver for a common Ethernet controller can be configured on secondary PCIe domain 222 in the same manner by exporting the artificial configuration space and device tree information to secondary PCIe domain 222 and allowing the same type of low level and high level operating system functions to find and configure them. Device drivers may have multiple queues used to access one or more physical resources. Devices that contain multiple queues each of which can independently control a common device can be made by similar mechanism available to CPU host 210 in secondary PCIe domain 222 and each secondary PCIe domain 222 can configure separate queues allocated for their own use. For one example, the simulated PCIe device and/or simulated configuration space can be made available and secondary PCIe domain 222 can program separate queues for all the benefits described in Ethernet controller 108 a example (SMP queues, virtual machines, or any other virtualization purpose.)

In addition, the system described herein is not limited to operate through operating system functions but may operate in any software system to gain the same advantage of avoiding changes to the key driver that can operate by VFs, queue based VFs, or other functions that allow separate PCIe access to device control. It will be appreciated that the function names listed in the present disclosure are well known LINUX operating system functions, but the operation of the system described herein is not limited to the use of that operating system or those functions. The system described herein may be applied to devices of any virtualization purpose such as storage controllers, or any kind of controller that has an SR-IOV type function, multiple physical functions, multiple queues, or any virtualization function.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. For example, although the embodiments are expressed using a single secondary PCIe domain, the embodiments are applicable to scenarios including multiple secondary PCIe domains. Other changes, substitutions, and alterations are also possible without departing from the scope of this disclosure as defined by the following claims.

What is claimed is:

1. A method for accessing a device in a primary peripheral component interconnect express (PCIe) domain from a secondary PCIe domain, the method comprising:
    determining, by a shared manager application executable in a central processing unit, one or more virtual functions of a device in the primary PCIe domain to be made available to the secondary PCIe domain for a configuration of the secondary PCIe domain, the shared manager application providing one or more interfaces enabling an exchange of information between the primary and secondary PCIe domains;
    installing, by the central processing unit, a first virtual function driver in the primary PCIe domain associated with the one or more virtual functions;
    communicating, by the central processing unit, the information corresponding to the one or more virtual functions to the secondary PCIe domain, the information used to install a second virtual function driver in the secondary PCIe domain associated with the one or more virtual functions in the primary PCIe domain, the second virtual function driver in the secondary PCIe domain having common properties as the first virtual function driver in the primary PCIe domain, and the second function driver running as an unchanged virtual function driver as the first virtual function driver; and
    accessing, by the central processing unit, the device in the primary PCIe domain from a request by the second virtual function driver in the secondary PCIe domain.

2. The method of claim 1, wherein the information corresponding to the one or more virtual functions provided to the secondary PCIe domain includes a base address register.

3. The method of claim 1, wherein the information corresponding to the one or more virtual functions provided to the secondary PCIe domain includes a part of a base address register.

4. The method of claim 1, wherein the information corresponding to the one or more virtual functions provided to the secondary PCIe domain includes a physical function associated with the device in the primary PCIe domain.

5. The method of claim 1, further comprising:
    establishing address translations between the primary PCIe domain and the secondary PCIe domain for accessing the device in the primary PCIe domain.

6. The method of claim 1, wherein the primary PCIe domain and the secondary PCIe domain are connected by a first primary endpoint coupled to a second primary endpoint such that the information is provided from the first PCIe domain to the secondary PCIe domain.

7. The method of claim 6, wherein the first primary endpoint and the secondary endpoint are Non Transparent Bridges (NTBs).

8. An apparatus for accessing a device in a separate domain, the apparatus comprising:
    a memory storing executable instructions; and
    a first peripheral component interconnect express (PCIe) domain including a Central Processing Unit (CPU) host have a shared manager application, a memory, and a first bridge device, the first bridge device coupled to a second bridge device of a second PCIe domain, the CPU host executing the instructions to:
        receive information corresponding to one or more virtual functions of an endpoint device in the second PCIe domain made available to the first PCIe domain for a configuration of the first PCIe domain, the shared manager application providing one or more interfaces enabling an exchange of information between the primary and secondary PCIe domains;
        install a virtual function driver associated with the one or more virtual functions, the virtual function driver in the first PCIe domain having common properties as a virtual function driver in the second PCIe domain and the second virtual function driver running as an unchanged virtual function driver as the first virtual function driver; and
        access the endpoint device in the second PCIe domain from the virtual function driver in the first PCIe domain.

9. The apparatus of claim 8, wherein the information corresponding to the one or more virtual functions received by the CPU host includes a base address register.

10. The apparatus of claim 8, wherein the information corresponding to the one or more virtual functions received by the CPU host includes a part of a base address register.

11. The apparatus of claim 8, wherein the information corresponding to the one or more virtual functions received by the CPU host includes a physical function associated with the device in the first second PCIe domain.

12. The apparatus of claim 8, wherein the CPU host further executes the instructions to establish address translations within the first bridge device and the second bridge device between the first PCIe domain and the second PCIe domain for accessing the device in the first PCIe domain.

13. An apparatus for accessing a device in a separate domain, the apparatus comprising:
    a memory storing executable instructions;
    a primary peripheral component interconnect express (PCIe) domain including a first Central Processing Unit (CPU) host having a shared manager application, an endpoint device, and a first bridge device; and
    a secondary PCIe domain including a second CPU host and a second bridge device;
    wherein the first CPU host executes the instructions to:
        determine one or more virtual functions of the endpoint device in the primary PCIe domain to be made available to the secondary PCIe domain for a configuration of the secondary PCIe domain, the shared manager application providing one or more interfaces enabling an exchange of information between the primary and secondary PCIe domains;
        install a first virtual function driver in the primary PCIe domain associated with the one or more virtual functions of the endpoint device; and
        communicate the information corresponding to the one or more virtual functions in the primary PCIe domain through the first and second bridge devices to the secondary PCIe domain; and wherein the second CPU host executes the instructions to:

install a second virtual function driver associated with the one or more virtual functions, wherein the second virtual function driver in the secondary PCIe domain having common properties as the first virtual function driver in the primary PCIe domain and running as an unchanged virtual function driver as the first virtual function driver; and access the endpoint device in the primary PCIe domain from the second virtual function driver in the secondary PCIe domain through the first and second bridge devices.

14. The apparatus of claim 13, wherein the information corresponding to the one or more virtual functions provided to the secondary PCIe domain includes a base address register.

15. The apparatus of claim 13, wherein the information corresponding to the one or more virtual functions provided to the secondary PCIe domain includes a part of a base address register.

16. The apparatus of claim 13, wherein the information corresponding to the one or more virtual functions provided to the secondary PCIe domain includes a physical function associated with the endpoint device in the primary PCIe domain.

17. The apparatus of claim 13, wherein the first and second CPU hosts establish address translations within the first and second bridge devices for accessing the endpoint device in the primary PCIe domain.

* * * * *